US011546772B2

(12) United States Patent
Parisot et al.

(10) Patent No.: US 11,546,772 B2
(45) Date of Patent: Jan. 3, 2023

(54) METHOD FOR PROVIDING ASSISTANCE FOR PAIRING A WI-FI TYPE TERMINAL WITH A WI-FI TYPE ACCESS POINT

(71) Applicant: SAGEMCOM BROADBAND SAS, Rueil Malmaison (FR)

(72) Inventors: Clément Parisot, Rueil Malmaison (FR); Laurent Acezat, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 528 days.

(21) Appl. No.: 16/466,765

(22) PCT Filed: Nov. 30, 2017

(86) PCT No.: PCT/EP2017/081040
§ 371 (c)(1),
(2) Date: Jun. 5, 2019

(87) PCT Pub. No.: WO2018/104148
PCT Pub. Date: Jun. 14, 2018

(65) Prior Publication Data
US 2020/0084616 A1    Mar. 12, 2020

(30) Foreign Application Priority Data
Dec. 9, 2016    (FR) ...................................... 1662249

(51) Int. Cl.
*G06F 15/16*    (2006.01)
*H04L 29/06*    (2006.01)
(Continued)

(52) U.S. Cl.
CPC ......... *H04W 12/50* (2021.01); *H04W 12/037* (2021.01); *H04W 12/37* (2021.01);
(Continued)

(58) Field of Classification Search
CPC ..... H04W 12/08; H04W 12/63; H04W 12/50; H04W 76/10; H04W 12/037; H04W 12/37; H04W 48/20; H04W 88/16; H04W 84/12; H04W 88/08; H04W 48/14; H04W 88/02; H04W 12/77
(Continued)

(56) References Cited

U.S. PATENT DOCUMENTS

| 2010/0046486 | A1 | 2/2010 | Maruyama | |
|---|---|---|---|---|
| 2012/0051244 | A1 | 3/2012 | Nagara | |
| 2012/0322379 | A1* | 12/2012 | Eun | G06F 3/04817 |
| | | | | 455/41.2 |
| 2014/0045520 | A1* | 2/2014 | Lim | H04W 4/023 |
| | | | | 455/456.1 |
| 2014/0141721 | A1* | 5/2014 | Kim | H04W 76/14 |
| | | | | 455/41.2 |

(Continued)

*Primary Examiner* — Haresh N Patel
(74) *Attorney, Agent, or Firm* — Muncy, Geissler, Olds & Lowe, P.C.

(57) ABSTRACT

Method for pairing a Wi-Fi type terminal with a Wi-Fi type access point connected to a display unit, the pairing method comprising the steps, implemented by the access point, of:
detecting the presence of a terminal;
detecting whether the terminal is located near the access point;
if the presence of the terminal near the access point is detected, displaying a message proposing to pair the terminal to the access point on the display unit;
when a pairing acceptance signal is received, displaying a pairing information message on the display unit providing assistance for pairing the terminal with the access point.

16 Claims, 2 Drawing Sheets

(51) Int. Cl.
*H04W 12/50* (2021.01)
*H04W 76/10* (2018.01)
*H04W 12/37* (2021.01)
*H04W 12/037* (2021.01)
*H04W 12/63* (2021.01)
*H04W 84/12* (2009.01)
*H04W 88/02* (2009.01)
*H04W 88/08* (2009.01)
*H04W 88/16* (2009.01)

(52) U.S. Cl.
CPC ............ *H04W 12/63* (2021.01); *H04W 76/10* (2018.02); *H04W 84/12* (2013.01); *H04W 88/02* (2013.01); *H04W 88/08* (2013.01); *H04W 88/16* (2013.01)

(58) Field of Classification Search
USPC .......................................................... 713/153
See application file for complete search history.

(56) References Cited

U.S. PATENT DOCUMENTS

| | | |
|---|---|---|
| 2014/0226819 A1 | 8/2014 | Dittrich |
| 2015/0092555 A1* | 4/2015 | Tam ................... H04W 88/08 370/235 |
| 2015/0161477 A1* | 6/2015 | Kashyap ............ H04N 21/4126 382/181 |
| 2015/0220110 A1* | 8/2015 | Brawer ................. G04G 21/04 361/679.03 |
| 2015/0257183 A1* | 9/2015 | Pentelka ............... G06F 1/1632 455/41.2 |
| 2016/0080511 A1* | 3/2016 | Baum ..................... H04L 67/34 370/338 |
| 2016/0127938 A1* | 5/2016 | Yoon .................... H04W 48/08 370/252 |
| 2016/0234221 A1 | 8/2016 | Junuzovic et al. |
| 2017/0026899 A1* | 1/2017 | Albert .................. H04W 76/10 |
| 2017/0142765 A1* | 5/2017 | Jales ................... H04W 48/20 |
| 2017/0171414 A1* | 6/2017 | Naito ................. H04N 1/00212 |
| 2017/0272522 A1* | 9/2017 | Moldsvor .............. H04L 67/18 |

* cited by examiner

METHOD FOR PROVIDING ASSISTANCE FOR PAIRING A WI-FI TYPE TERMINAL WITH A WI-FI TYPE ACCESS POINT

The invention relates to the field of pairing a Wi-Fi type terminal with a Wi-Fi type access point.

BACKGROUND OF THE INVENTION

The pairing of a Wi-Fi terminal, e.g. a mobile telephone, with a Wi-Fi access point, e.g. a decoder box (or "set-top" box) or with a residential gateway, is conventionally performed as follows.

The terminal begins by searching for available networks by scanning its environment while searching for such available networks.

The terminal user then selects one of the available networks on the terminal and inputs an encryption key giving access to the selected network.

The encryption key is sometimes written on a label situated on the access point, or else it may be known to the user who previously defined the encryption key via a configuration interface of the access point.

The encryption key may also be input by scanning a barcode of the quick response (QR) type. Using a QR code generally requires making use of a specific application that has been downloaded to the terminal.

It is also possible to pair the terminal by making use of the Wi-Fi protected setup (WPS) protocol. The WPS protocol defines a plurality of configurations for connecting a terminal in secure manner to an access point, which configurations include a so-called "pushbutton" configuration (PBC) that requires access to a physical button on the access point.

Thus, a prior art decoder box 1 is known, as shown in FIG. 1, and it proposes two types of association (pairing by inputting an encryption key and pairing by using a WPS protocol). The decoder box 1 has a liquid crystal screen 2 on which the decoder box 1 displays the encryption key 3.

Pairing the terminal to the access point is thus relatively complex, in particular when the user is not familiar with new technologies.

OBJECT OF THE INVENTION

An object of the invention is to simplify pairing a Wi-Fi type terminal with a Wi-Fi type access point.

SUMMARY OF THE INVENTION

In order to achieve this object, there is provided a pairing method for pairing a Wi-Fi type terminal with a Wi-Fi type access point connected to a display, the pairing method comprising the following steps performed by the access point:

detecting the presence of a terminal;
detecting whether the terminal is in the proximity of the access point;
if it is detected that the terminal is present in the proximity of the access point, displaying on the screen a message proposing pairing the terminal with the access point;
when a pairing agreement signal is received, providing assistance for pairing the terminal with the access point.

The terminal is thus paired with the access point at the initiative of the access point, which provides assistance to a user in possession of the terminal, should that user desire to pair the terminal with the access point. The pairing method of the invention thus makes pairing simpler and more intuitive.

There is also provided a decoder box including processor means arranged to perform the above-described pairing method.

There is also provided a gateway including processor means arranged to perform the above-described pairing method.

There is also provided a computer program including instructions for enabling equipment of the decoder box or gateway type to perform the above-described pairing method.

There are also provided storage means storing a computer program including instructions enabling equipment of the decoder box or gateway type to perform the above-described pairing method.

Other characteristics and advantages of the invention appear on reading the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

The invention is presently illustrated in a situation in which a visiting user having a Wi-Fi terminal, specifically a mobile telephone, is visiting a resident user. The resident user's home is provided with a Wi-Fi access point (AP), specifically a decoder box, and a TV set. The decoder box is connected to the TV set.

Figure 2:
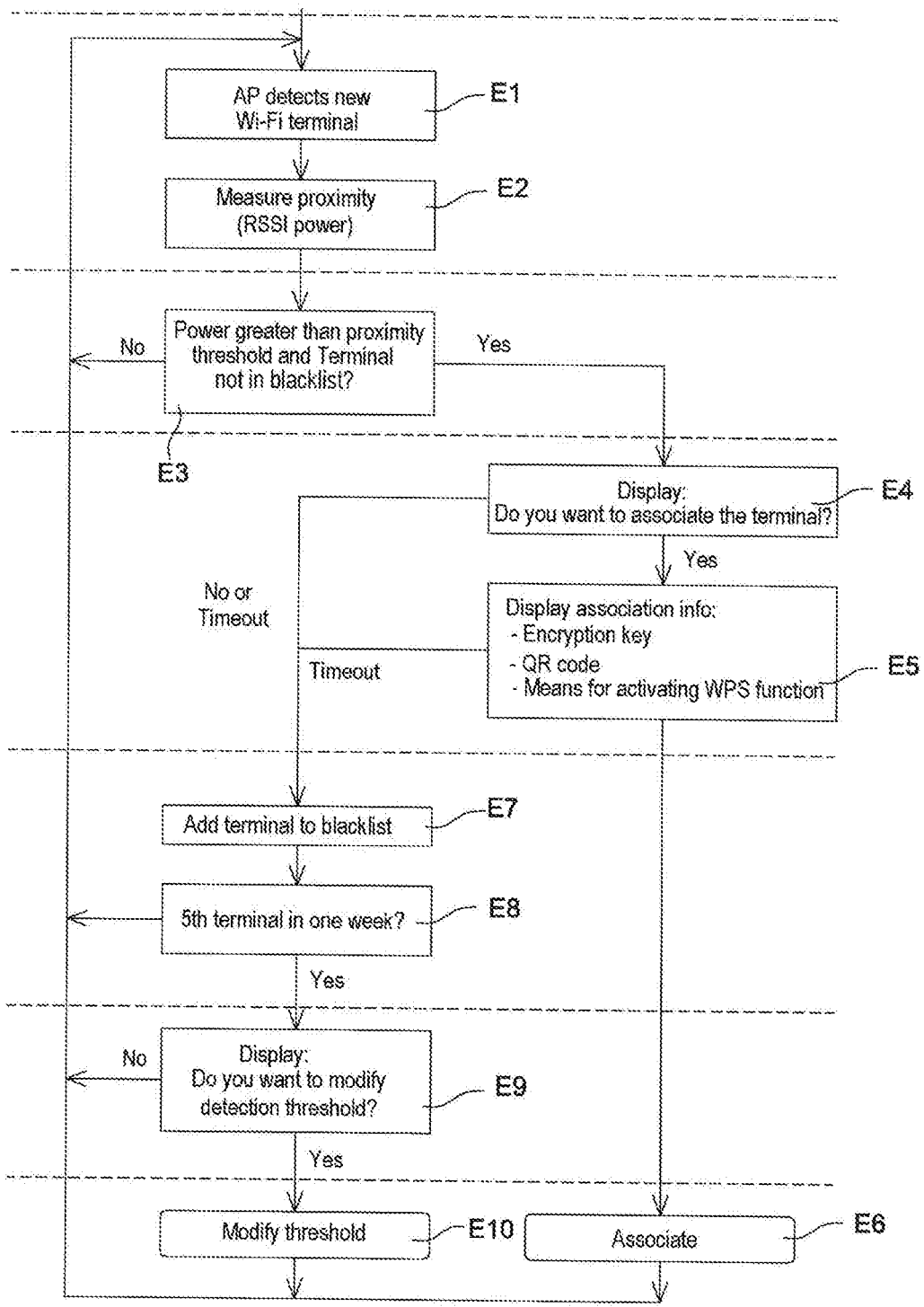
FIG. 2 shows the steps of the pairing method of the invention.

With reference to FIG. 2, there follows a description of the pairing method of the invention.

When the visiting user is in the resident user's home, the decoder box detects the presence of the mobile telephone (step E1).

The presence of the mobile telephone is detected as follows.

In general manner, any Wi-Fi terminal, such as the mobile telephone in the possession of the visiting user, and that is not paired with a Wi-Fi access point, such as the decoder box, scans its environment searching for Wi-Fi networks and access points. To do this, The Wi-Fi terminal transmits request frames (known as "probe requests") enabling the Wi-Fi terminal to communicate with the Wi-Fi access points in order to discover their characteristics for the purposes of a possible pairing. Reference may be made to the IEEE 802.11 WLAN 2012 standard, and in particular to its paragraph 8.3.3 Management frames and, more particularly, its paragraph 8.3.3.9 Probe Request frame format, in order to obtain more information about such request frames. In this example, the request frames are transmitted on all available channels, and contain a list of the authentication modes and of the data rates that are supported by the Wi-Fi terminal. The receiving access point responds by sending response frames (known as "probe responses") that contain similar information about the access point. This exchange of request frames and of response frames is a step prior to any pairing.

The mobile telephone is identifiable by its medium access control (MAC) address, which is specific thereto. This MAC address is included in the request frames transmitted by the mobile telephone.

The decoder box thus detects the presence of the mobile telephone when the decoder box receives request frames transmitted by the mobile telephone.

Once the decoder box has detected the presence of the mobile telephone, the decoder box detects whether or not the mobile telephone is in the proximity of the decoder box.

Specifically, it is not desirable to attempt to pair the decoder box in the resident user's home with a Wi-Fi terminal that is located outside the resident user's home, e.g. in a neighboring house, in a neighboring apartment, or in the street.

Indeed, it is not desirable to attempt to pair the decoder box with a Wi-Fi terminal that is not in the same room as the decoder box. Specifically, and as described in greater detail below, the pairing method of the invention produces messages on the screen of the TV set connected to the decoder box, and there is no point in attempting to display information on the TV screen for use by the visiting user if the visiting user cannot access that information.

Detecting that the mobile telephone is present in the proximity of the decoder box is performed as follows.

The decoder box detects that the mobile telephone is in the proximity of its own position when the decoder box receives a signal transmitted by the mobile telephone at a received power level that is greater than a predetermined power threshold.

Specifically, the signal used is made up of the request frames transmitted by the mobile telephone, and the received power corresponds to a received signal strength indication (RSSI) power.

By default, the predetermined power threshold corresponds to the RSSI power of a terminal situated at a distance of 2 meters (m).

The predetermined power threshold depends on the design of the radio functions of the decoder box, and it is defined during calibration operations performed in a laboratory, prior to manufacturing the decoder box. By way of example, the calibration operations consist in defining the meaning of RSSI power measurements that have been obtained at the desired distance (in this example 2 m) for a plurality of reference Wi-Fi terminals (e.g. 10 terminals) in a reference environment, such as a model apartment, for example.

Thus, after detecting the presence of the mobile telephone, the decoder box measures the RSSI power associated with the mobile telephone (step E2), and then compares the measured RSSI power with the predetermined power threshold (step E3).

If the measured RSSI power is less than or equal to the predetermined power threshold, then the decoder box does not detect that the mobile telephone is located in the proximity of the decoder box, and therefore does not propose pairing the mobile telephone with the decoder box.

If the measured RSSI power is greater than the predetermined power threshold, then the decoder box detects that the mobile telephone is located in the proximity of the decoder box.

The decoder box then displays on the TV screen a message proposing pairing the mobile telephone with the decoder box (step E4). The pairing proposal message may appear in the form of an intrusive or "pop-up" window.

In this example, the message is of the following type:

---
The peripheral [MAC address] is not yet connected to this network,
Do you want to connect it? Press [OK], or [Exit] in order to refuse.
---

The visiting user can then accept pairing by pressing the [OK] key on a remote control of the decoder box. Pressing on the [OK] key thus amounts to transmitting a pairing agreement signal to the decoder box.

The visiting user can also refuse pairing by pressing the [Exit] key on the remote control of the decoder box. Pressing on the [Exit] key thus amounts to transmitting a pairing refusal signal to the decoder box.

If the decoder box receives a pairing agreement signal, the decoder box displays a pairing information message on the screen of the TV set to provide assistance in pairing of the mobile telephone with the decoder box (step E5).

In this example, the pairing information message includes an encryption key and a QR code and instructions for using a WPS protocol. Naturally, it is possible for the pairing information message to include only some of that information.

In this example, the pairing information message is of the following type:

---
Encryption key: xxxxxxxxxxxxxxxxxxxxxxx.
QR code. Scan with your terminal and a code-reader application.
To activate the WPS function, press on the [OK] key of the remote control.
---

With the assistance provided by the pairing information message, and using the decoder box, the visiting user can then pair the WiFi telephone with the decoder box (step E6). The visiting user then has access to the Wi-Fi network.

The pairing information message is deleted after a first predetermined duration, e.g. equal to 30 seconds.

After step E4, if the decoder box receives a pairing refusal signal, or else if, after step E5, no pairing action is performed within the first predetermined duration, the identifier of the mobile telephone is stored in a "blacklist" of the decoder box (step E7).

The blacklist is a list of Wi-Fi terminal identifiers for which it is appropriate not to propose pairing with the decoder box. The blacklist thus comprises the identifiers of Wi-Fi terminals belonging to the resident user's neighbors, or the identifier of a Wi-Fi terminal of the resident user that the resident user does not want to be paired with the decoder box, or indeed the identifier of a Wi-Fi terminal of a visiting user who visits the resident user frequently and does not want to be connected to Wi-Fi in the resident user's home.

Thus, when the visiting user or the resident user refuses to pair a Wi-Fi terminal with the decoder box, this refusal is stored and the identifier of said Wi-Fi terminal is entered into the blacklist. Next time said Wi-Fi terminal is detected, the decoder box will not propose pairing it with the decoder box.

By means of this blacklist, it is ensured that the situation does not arise in which a resident user watching TV is disturbed by pop-up windows appearing every time the decoder box detects a neighbor's Wi-Fi terminal.

It should be observed that, during the above-described step E3, which consists in comparing the measured RSSI power with the predetermined power threshold, the decoder box also verifies whether the mobile telephone is or is not in the blacklist. If it is, then the decoder box does not propose pairing the mobile telephone with the decoder box.

After step E7, if the identifier of the mobile telephone is stored in the blacklist, the decoder box verifies whether the number of successive pairing refusal signals that have been received over a second predetermined duration from different Wi-Fi terminals is greater than a predetermined refusal threshold. By way of example, the predetermined refusal threshold is equal to five, and the second Predetermined duration is equal to one Week (step E8).

This situation may arise in particular due to a predetermined power threshold that is wrongly set, thereby leading to Wi-Fi terminals being detected too frequently. The decoder box then displays a menu on the TV screen enabling the resident user to deactivate the function corresponding to implementing the pairing method of the invention, or else enabling the resident user to reduce the sensitivity of said function by proposing different predetermined power thresholds corresponding to shorter distances between the decoder box and a Wi-Fi terminal (step E9).

When the user chooses to modify the predetermined power threshold, e.g. by using the remote control of the decoder box, the new predetermined power threshold is stored in the decoder box (step E10).

By way of example, the various predetermined power thresholds may correspond to a distance of 1 m or of 0.5 m. It is also possible to allow the visiting user or the resident user to select the power level to be taken into account by acting on a cursor that is displayed on the TV screen. By using a remote control, the cursor may be movable between a first mark referenced "0%" and a second mark referenced "100%", the first mark corresponding to detecting a terminal at a considerable distance (e.g. 15 m), and the second mark corresponding to detecting a terminal at zero distance. By way of example, the power thresholds corresponding to the first mark and to the second mark may be set using calibration operations similar to those described above.

Naturally, the invention is not limited to the embodiment described, but covers any variant coming within the ambit of the invention as defined by the claims.

Above, assistance for pairing of the terminal with the access point is described as consisting in displaying a pairing information message on the display. Nevertheless, the assistance could be provided differently. In particular, the assistance could consist in pairing the terminal directly with the access point, after receiving the pairing agreement signal. By way of example, the direct pairing in question may make use of a protocol of the WPS type. It is also possible for both types of assistance to be proposed.

The pairing proposal message displayed during step E4 may thus propose three options:

an automatic pairing option that pairs the terminal directly with the access point by using the WPS type protocol;

a manual pairing option that displays the pairing information message;

a pairing refusal option that leads directly to step B7.

The user makes use of the remote control of the decoder box to select one particular option.

It is naturally possible for the access point to be other than a decoder box and for the terminal to be other than a mobile telephone. By way of example, the access point may be a residential gateway, and the terminal may be a tablet.

Figure 1:
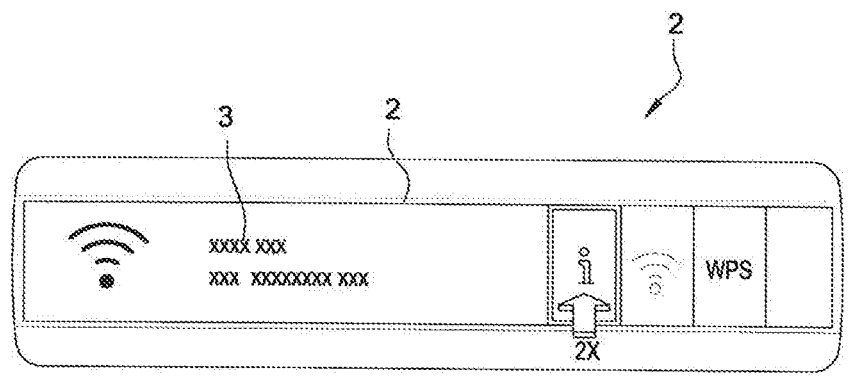
FIG. 1 shows a prior art decoder box.

The display that is used, which is connected to the access point, need not necessarily be a TV screen, but could for example be a display integrated in the access point itself (such as the screen 2 in FIG. 1).

The access point and the terminal are not necessarily a Wi-Fi access point and a Wi-Fi terminal: the invention applies to any type of communications protocol in any type of wireless network.

The visiting user does not necessarily communicate with the access point via a remote control, but could communicate via any type of communications channel, e.g. using a mobile telephone or an interface situated on the access point.

Naturally, the pairing information message may contain information other than that described above.

The invention claimed is:

1. A pairing method for pairing a Wi-Fi type terminal with a Wi-Fi type access point connected to a display, the pairing method comprising the following steps performed by the access point:

detecting the presence of a terminal;

detecting whether the terminal is in the proximity of the access point;

if it is detected that the terminal is present in the proximity of the access point, displaying on the display a message proposing pairing the terminal with the access point;

when a pairing agreement signal is received, providing assistance for pairing the terminal with the access point; and when a pairing refusal signal is received, storing in a list the identifier of a terminal from which a pairing refusal signal has been received;

wherein the pairing agreement signal is transmitted by a user in possession of the terminal to the access point when the user accept pairing in response to the message proposing pairing the terminal with the access point;

wherein the pairing refusal signal is transmitted by the user to the access point when the user refuse pairing in response to the message proposing pairing the terminal with the access point;

wherein the assistance is provided by the access point to the user in order to ease the pairing of the terminal with said access point.

2. The pairing method according to claim 1, wherein the presence of the terminal is detected when the access point receives request frames transmitted by the terminal.

3. The pairing method according to claim 1, wherein the presence of the terminal in the proximity of the access point is detected when the access point receives a signal transmitted by the terminal with received power greater than a predetermined threshold.

4. The pairing method according to claim 3, including the step of displaying on the display a message proposing modifying the predetermined power threshold.

5. The pairing method according to claim 4, wherein the message proposing adjusting the predetermined power threshold is displayed when a number of successive pairing refusal signals received from different terminals is greater than a predetermined refusal threshold.

6. The pairing method according to claim 1, including the step of not displaying the pairing proposal message for a terminal having its identifier in the list.

7. The pairing method according to claim 1, wherein the access point comprises equipment of the decoder box or gateway type.

8. The pairing method according to claim 1, wherein the assistance consists in pairing the terminal directly with the access point.

9. The pairing method according to claim 8, wherein direct pairing makes use of a WPS type protocol.

10. The pairing method according to claim 1, wherein the assistance consists in displaying a pairing information message on the display.

11. The pairing method according to claim 10, wherein the pairing information message includes an encryption key or a QR code or instructions for using a WPS type protocol.

12. The pairing method according to claim 1, wherein the display is a TV screen.

13. The pairing method according to claim 1, wherein the display is integrated in the access point.

14. A decoder box including hardware processor means arranged to perform the pairing method according to claim 1.

15. A gateway including hardware processor means arranged to perform the pairing method according to claim 1.

16. A non-transitory computer-readable storage medium storing a computer program including instructions for enabling equipment of the decoder box or gateway type to perform the pairing method according to claim 1.

\* \* \* \* \*